(12) United States Patent
Bhatia et al.

(10) Patent No.: US 7,806,454 B2
(45) Date of Patent: Oct. 5, 2010

(54) INTEGRATED CARRIER ASSEMBLY FOR A SEAT BACK OF A MOTOR VEHICLE

(75) Inventors: Vikas Bhatia, South Lyon, MI (US); Gregory Todd Donovan, Britton, MI (US); John Fredrik Runske, Howell, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/341,341

(22) Filed: Dec. 22, 2008

(65) Prior Publication Data
US 2010/0156133 A1 Jun. 24, 2010

(51) Int. Cl.
*B60N 2/02* (2006.01)

(52) U.S. Cl. .............................. 296/65.16; 217/216.13

(58) Field of Classification Search .............. 296/65.16, 296/65.17; 297/216.13
See application file for complete search history.

(56) References Cited

U.S. PATENT DOCUMENTS

| 5,599,070 | A | 2/1997 | Pham et al. |
|---|---|---|---|
| 5,848,820 | A | 12/1998 | Hecht et al. |
| 6,030,046 | A | 2/2000 | Dorow |
| 6,296,291 | B1 * | 10/2001 | Lansinger ................ 296/65.16 |
| 6,513,873 | B2 | 2/2003 | Tsuda et al. |
| 7,165,808 | B2 | 1/2007 | Harland et al. |
| 7,192,088 | B1 | 3/2007 | Trombley et al. |
| 7,338,121 | B1 * | 3/2008 | Pilcher et al. ................ 297/253 |
| 2002/0027383 | A1 | 3/2002 | Tsuda et al. |
| 2004/0080195 | A1 | 4/2004 | Adams et al. |
| 2007/0114826 | A1 | 5/2007 | Austin et al. |

* cited by examiner

*Primary Examiner*—Joseph D Pape
(74) *Attorney, Agent, or Firm*—Gifford, Krass, Sprinkle, Anderson & Citkowski, P.C.

(57) ABSTRACT

A carrier assembly of a seat assembly for use in a motor vehicle allows for the efficient installation of the carrier assembly and several seat assembly accessories. The seat assembly has a seat back, a locking frame and a seat cushion. The carrier assembly includes an elongated base member extending along a longitudinal axis. A pair of outer hinge brackets are attached to the ends of the elongated base member. The seat back is pivotally mounted to the outer hinge brackets about a pivot axis that is spaced apart and parallel to said longitudinal axis of the elongated base member. A pair of floor brackets attached to the ends of the elongated base member secures the elongated base member to the floor of the motor vehicle. The carrier assembly is independent of the locking frame and the seat cushion.

11 Claims, 3 Drawing Sheets

INTEGRATED CARRIER ASSEMBLY FOR A SEAT BACK OF A MOTOR VEHICLE

FIELD OF THE INVENTION

The present invention relates to seat assemblies for use in motor vehicles. More particularly, the invention relates to a carrier assembly of a seat assembly, which is used for the attachment of a seat back to a motor vehicle.

BACKGROUND OF THE INVENTION

Motor vehicles include seat assemblies for supporting occupants within an interior passenger compartment. It is known to provide seat assemblies with pivoting seat backs, which fold from a generally vertical seated position to a generally horizontal stowed position to increase the cargo carrying capacity of the motor vehicle. In previously known seat assemblies, carrier assemblies have been used as an intermediate between the pivoting seat back and the floor of the motor vehicle.

The carrier assembly is secured to the floor of the motor vehicle and then the seat back is pivotally mounted to the carrier assembly. However, these previously known carrier assemblies are attached not only to the floor of the motor vehicle but also to additional structures of the seat assembly such as a seat cushion frame, and/or a locking frame. The seat cushion frame being the structure that attaches the seat cushion to the motor vehicle, while the locking frame mounts a locking mechanism which releasably locks the seat back in the generally vertical seated position.

If the carrier assembly is attached to the additional structures prior to its installation into the motor vehicle, the resulting assembly is a large, heavy and cumbersome structure which requires increased amounts of time and labor to properly align and install. However, attaching the carrier assembly to the additional structures after it has been installed into the motor vehicle requires tedious, labor intensive process in a confined space. Therefore, these additional connections, whether prior to the carrier assembly being installed in the vehicle or after, are time and labor consuming and result in an installation process that is costly and inefficient.

In addition, several seat assembly accessories are required to be installed to complete the seat assembly. The separate attachment of these accessories increases the amount of labor and time required to install the seat assembly.

Thus, there exists a need for a carrier assembly, having pre-attached seat assembly accessories, which can be quickly and efficiently installed into a motor vehicle without being attached to additional seat assembly frame structures.

SUMMARY OF THE INVENTION

The present invention provides a carrier assembly which overcomes the above-mentioned disadvantages of the previously known seat assemblies.

In brief, the inventive carrier assembly of a seat assembly provides an efficient installation process. The seat assembly also includes a seat back, a locking frame and a seat cushion. The carrier assembly includes an elongated base member extending along a longitudinal axis. A pair of outer hinge brackets attach to the ends of the elongated base member. The seat back is pivotally mounted to the outer hinge brackets about a pivot axis that is spaced apart and parallel to the longitudinal axis of the elongated base member. A pair of floor brackets attached to the ends of the elongated base member to secure the elongated base member to the floor of the motor vehicle. The carrier assembly is independent of the locking frame and the seat cushion.

The carrier assembly, optionally, includes an inner hinge bracket which can be used to further pivotally mount the seat back about the pivot ax is. Further, if the seat back includes more than one portion, such as a 60/40 seat back, a first portion of the seat back can be pivotally mounted to one of the pair of outer hinge brackets and the inner hinge bracket about the pivot axis, and a second portion of the seat back can be pivotally mounted to the inner hinge bracket and the other of the pair of outer hinge brackets about the pivot axis.

BRIEF DESCRIPTION OF THE DRAWINGS

Advantages of the inventive integrated carrier assembly will be readily appreciated as the same becomes better understood by reference to the following detailed description when considered in connection with the accompanying drawing wherein:

FIG. 4 is a partial perspective view of the floor of a motor vehicle illustrating the seat back attached to the carrier assembly, according to a third embodiment.

DETAILED DESCRIPTION OF THE INVENTION

The present invention has utility as an independent carrier assembly which overcomes the above-mentioned disadvantages. By providing the integrated carrier assembly as an independent component of the seat assembly, the integrated carrier assembly can be quickly and efficiently installed into the motor vehicle. Further, by joining the integrated carrier assembly with seat assembly accessories, such as iso-fix wires and seat belt anchors, the integrated carrier assembly acts as a platform to which the previously separately installed seat assembly accessories can be attached in a single step. Thus, the installation of the integrated carrier provides a cost and labor efficient installation process.

Figure 1:
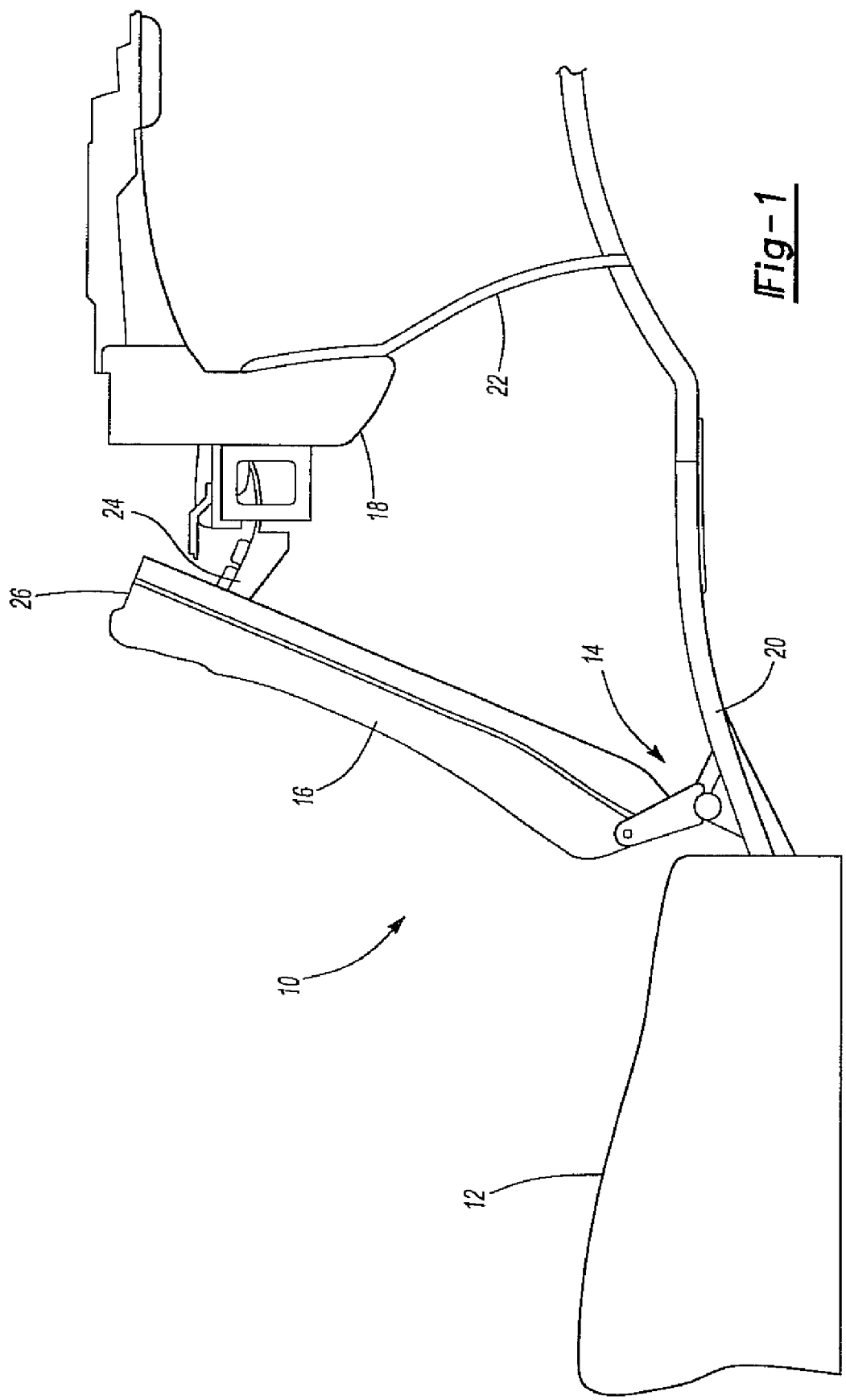
FIG. 1 is a partial side view illustrating a seat assembly of a motor vehicle with the inventive carrier assembly.

Referring to the FIG. 1, a seat assembly for a motor vehicle is generally indicated at 10. The seat assembly 10 includes a seat cushion 12, a carrier assembly 14, a seat back 16, and a locking frame 18. The seat cushion 12 is fixedly secured to a seat cushion frame (not shown) which is used to attached the seat cushion 12 to the floor 20. The seat cushion 12 and the seat cushion frame are a separate component of the seat assembly and, as such, require no attachment to or connection to the carrier assembly 14.

The locking frame 18 is attached directly to the motor vehicle body 22, and may optionally be formed integral with the motor vehicle body 22. As such, the locking frame 18 is independent of the carrier assembly 14 and the seat cushion 12.

A locking mechanism 24 is located on the locking frame 18 and engages a receiving portion (not shown), located on an upper portion 26 of the seat back 16, to lock the seat back 16 into a substantially vertical seated position. It will be appreciated that the location of the locking mechanism 24 and the receiving portion may be swapped such that the locking mechanism 24 is located on the upper portion 26 of the seat back 16 and the receiving portion is located on the locking frame 18.

The inventive carrier assembly 14 is independent, that is not connected to either the seat cushion 12, the seat cushion frame (not shown), or the locking frame 18. As the carrier assembly 14 is independent from other frame structures, it can be quickly and efficiently installed into the motor vehicle. Further, as the seat back 16 is fixedly attached, albeit pivotally as described in greater detail below, only to the carrier assembly 14 the seat back 16 can be attached to the carrier assembly 14 prior to its installation into the motor vehicle. As such, the installation of the carrier assembly 14, would simultaneously install the seat back 16, thereby providing a quick and efficient installation process of the carrier assembly 14 and the seat back 16.

Figure 2:
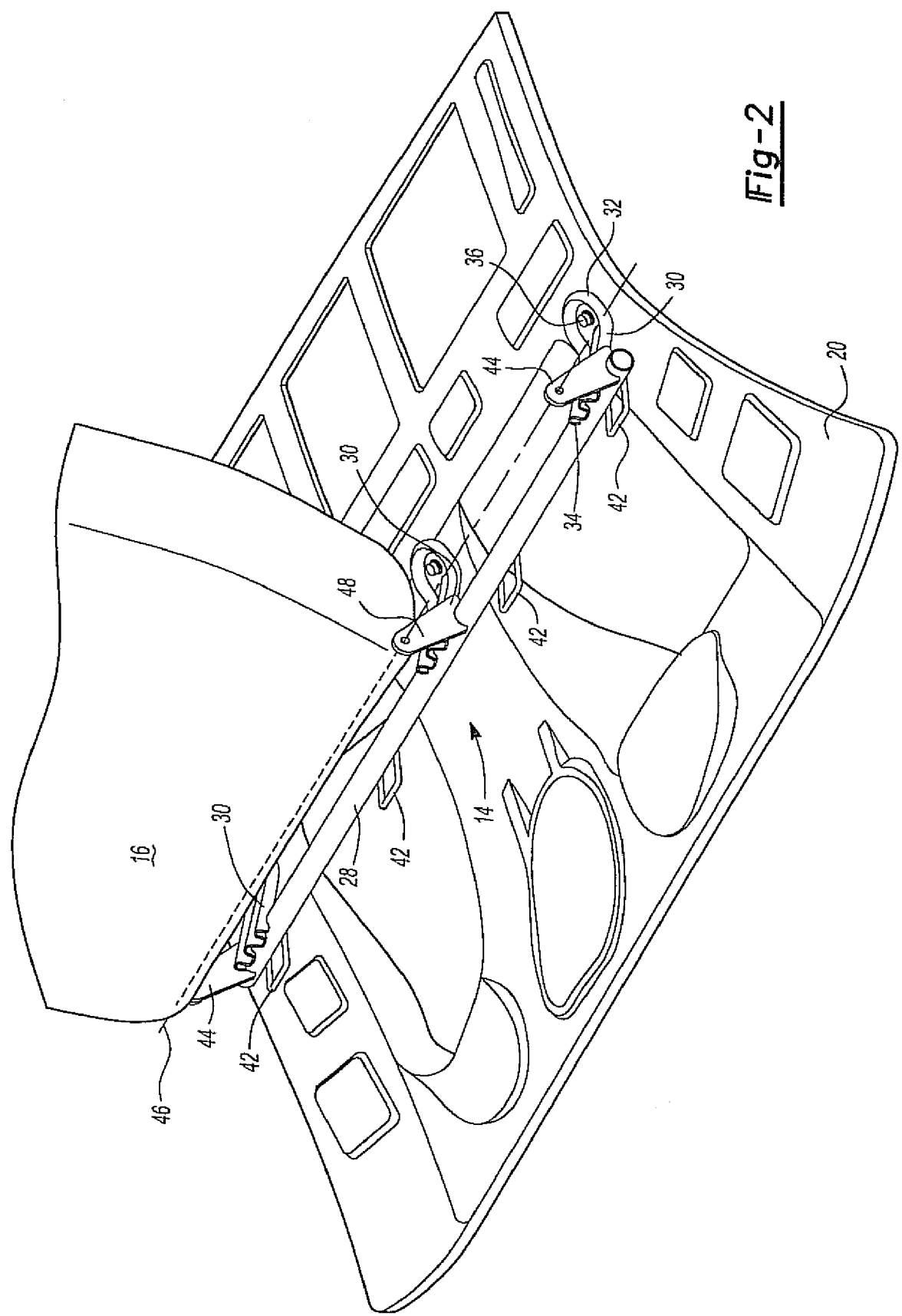
FIG. 2 is a partial perspective view of the floor of a motor vehicle illustrating the seat back attached to the carrier assembly.

With reference to FIG. 2, the carrier assembly 14 includes an elongated base member 28 which spans substantially the entire width of the seat back 16. The elongated base member 28 optionally is an elongated rod having a circular cross-sectional shape, or any other suitable non-circular cross-sectional shape.

Floor brackets 30 secure the elongated base member 28 to the floor 20 aft of the elongated base member 28 (i.e. towards the rear of the motor vehicle). A floor bracket 30 is attached to each end of the elongated base member 28 to secure the carrier assembly 14 to the floor 20. The carrier assembly, optionally, includes a floor bracket 30 located between the floor brackets 30 attached to the ends of the elongated base member 28.

In a preferred embodiment, floor brackets 30 have a securing portion 32 at one end and a connecting portion 34 at the opposite end. The connecting portion 34 attaches the elongated base member 28 to the floor bracket 30, and the securing portion 32 attaches the floor bracket 30 to the floor 20. The securing portion 32, preferably, attaches to the floor at a single point, such as by a single spot weld or a single application of an adhesive, or through the use of a single fastener 36, illustratively including a bolt, rivet, or screw. By attaching the floor bracket 30, at the securing portion 32, to the floor 20 at a single point or by a single fastener 36 allows the carrier assembly 14 to be quickly and efficiently installed into the motor vehicle, by minimizing the number of steps in the installation process.

Figures 3, 3A:
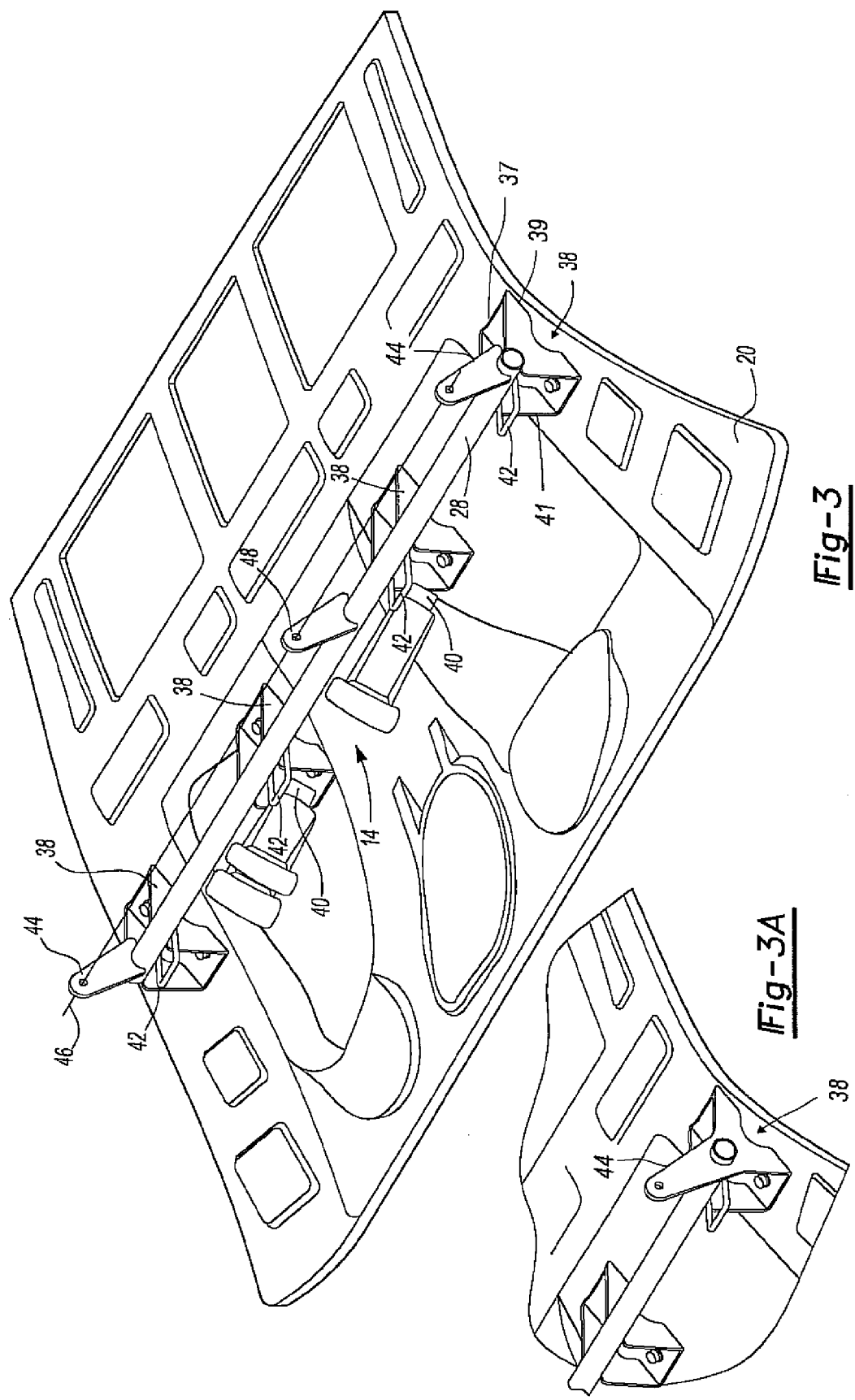
FIG. 3 is a partial perspective view of the floor of a motor vehicle illustrating the seat back attached to the carrier assembly, according to a second embodiment.

In a second embodiment, as illustrated in FIG. 3, the elongated base member 28 is attached to the floor 20 by double floor brackets 38. The double floor bracket 38 includes a generally planar section 37 which is in contact with the floor 20 and connects to the floor 20 at multiple points or by multiple fasteners. The generally planar section 37 is disposed beneath the ends of the elongated base member 28. An outer wall 39 and an inner wall 41 extends from the generally planar section 37 to the elongated base member 28, wherein the outer wall 39 is disposed on the outer side of the generally planar section 37 and the inner wall 41 is disposed on the inner side of to generally planar section 37. Further, as seen in FIG. 3A the double brackets 38 are optionally formed integrally with an outer hinge bracket 44, which will be described in greater detail below. In a third embodiment, the elongated base member 28 can be attached to the floor 20 through a combination of floor brackets 30 and double floor brackets 38, where double floor brackets 38 are used to provide additional securing strength between the elongated base member 28 and the floor 20.

As seen in FIGS. 2 and 3, seat belt anchors 40 are integrally formed with the double floor brackets 38, such that installation of the carrier assembly 14 simultaneously installs an anchor for the receiving end of a seat belt locking mechanism. The seat belt anchors 40 may be attached to a bracket and/or tab (not shown) extending outwardly from the floor brackets 30 and/or double floor brackets 38. Optionally, the seat belt anchors 40 are formed integral with the floor brackets 30 and/or allow for the attachment of one or two receiving ends of a seat belt locking mechanism.

A plurality of iso-fix wires 42 are attached along the longitudinal axis of the elongated base member 28. The iso-fix wires 42 extend from the elongated base member 28 to the bite line between the seat back 16 and the seat cushion 12 to provide an anchor for child restraint seats. The position of the iso-fix wires 42 along the elongated base member 28 allow for the alignment of the child restraint seat and the seat assembly 10 to correctly secure the child restraint seat. Further, the iso-fix wires 42 may be positioned to be in compliance with any governing law, statute or regulation. The iso-fix wires 42 may be wire bent into a generally U-shape and having the ends of the wire attached directly to the elongated base member 28. In addition, the iso-fix wires 42 may be attached to the elongated base member 28 through the use of an intermediate component, illustratively including an attachment clip, or a securing device.

An outer hinge bracket 44 is attached to each end of the elongated base member 28. The pair of outer hinge brackets 44 pivotally mounts the seat back 16 about a pivot axis 46 for movement between a generally vertical seated position and a generally horizontal stowed position. The pivot axis 46 is generally parallel to and spaced apart from the longitudinal axis of the elongated base member 28. An inner hinge bracket 48 can be used in addition to the outer hinge brackets 44 to pivotally mount the seat back 16 about the pivot axis 46.

The seat back may optionally include more than one portion, such as in a 60/40 seat back, as seen in FIG. 2. In such a configuration the seat back 16 includes a first portion and a second portion (not shown). The first portion of the seat back 16 is pivotally mounted to one of the pair of outer hinge brackets 44 and the inner hinge bracket 48 about the pivot axis 46, and a second portion of the seat back 16 is pivotally mounted to the inner hinge bracket 48 and the other outer hinge bracket 44 about the pivot axis 46.

The invention has been described in an illustrative manner. It is, therefore, to be understood that the terminology used is intended to be in the nature or words of description rather than of limitation. Many modifications and variations of the invention are possible in light of the above teachings. Thus, within the scope of the appended claims, the invention may be practiced other than as specifically described.

It is claimed:

1. A carrier assembly for a seat assembly, for use in a motor vehicle having a floor, the seat assembly having a seat back, a locking frame and a seat cushion, said carrier assembly comprising:

an elongated base member extending along a longitudinal axis, said elongated base member having a pair of ends;

a pair of outer hinge brackets each attached to each one of said pair of ends of said elongated base member, the seat back being pivotally mounted to said pair of outer hinge brackets about a pivot axis that is spaced apart and parallel to said longitudinal axis of said elongated base member; and a pair of floor brackets attached to each end of said elongated base member to rigidly secure said elongated base member to the floor of the motor vehicle, each of said pair of floor brackets having a generally planar section extending beneath said elongated base member and contacting the floor, each of said pair of floor brackets having a pair of walls extending from either side of said planar section to said elongated base member;

wherein said carrier assembly is independent of the locking frame and the seat cushion.

2. The carrier assembly of claim 1, wherein said elongated base member has a circular cross-section.

3. The carrier assembly of claim 1, further comprising an inner hinge bracket to pivotally mount the seat back about said pivot axis.

4. The carrier assembly of claim 3, wherein a first portion of the seat back is pivotally mounted to one of said pair of outer hinge brackets and said inner hinge bracket about said pivot axis, and a second portion of the seat back is pivotally mounted to said inner hinge bracket and the other of said pair of outer hinge brackets about said pivot axis.

5. The carrier assembly of claim 1, further comprising at least one inner floor bracket located between said pair of floor brackets, said at least one inner floor bracket rigidly secures said elongated base member to the floor of the motor vehicle.

6. The carrier assembly of claim 5, wherein each of said at least one inner floor bracket is secured to the floor of the motor vehicle, aft of said elongated base member by a single fastener.

7. The carrier assembly of claim 5, further comprising at least one seat belt anchor attached to each of said at least one inner floor bracket.

8. The carrier assembly of claim 1, further comprising a plurality of iso-fix wires attached to said elongated base member.

9. The carrier assembly of claim 1, wherein said pair of outer hinge brackets are formed integral with said pair of floor brackets.

10. The carrier assembly of claim 1, wherein said elongated base member spans substantially the entire width of the seat back.

11. The carrier assembly of claim 1, wherein a locking mechanism releasably locks the locking frame to the seat back, such that the seat back is in a generally vertical seated position.

* * * * *